United States Patent Office.

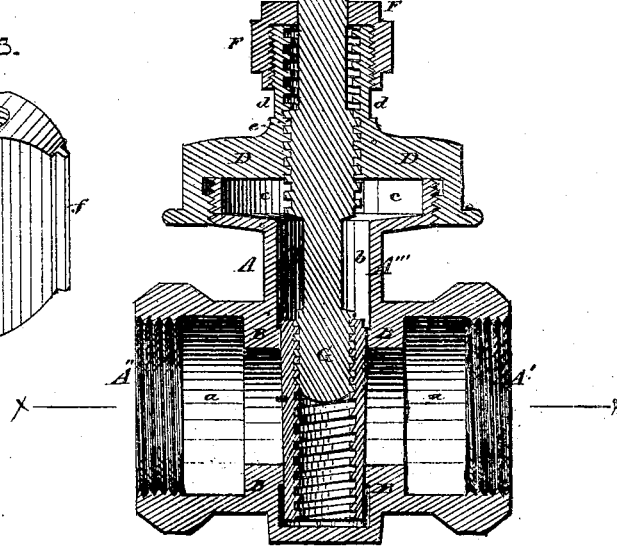

GEORGE MURRAY, JR., OF CAMBRIDGEPORT, MASSACHUSETTS, ASSIGNOR TO HIMSELF, GEORGE MURRAY, SR., AND HENRY E. SNOW, OF SAME PLACE.

Letters Patent No. 111,373, dated January 31, 1871.

IMPROVEMENT IN VALVES.

The Schedule referred to in these Letters Patent and making part of the same.

*To all whom it may concern:*

Be it known that I, GEORGE MURRAY, Jr., of Cambridgeport, in the county of Middlesex and in the State of Massachusetts, have invented certain new and useful Improvements in Valves; and do hereby declare that the following is a full, clear, and exact description thereof, reference being had to the accompanying drawing making a part of this specification, in which—

Figure 1 is a vertical, central, and lateral cross-section of my device, and

Figure 2 is a horizontal cross-section of the same on the line *x x* of fig. 1; and Figures 3 and 4, respectively, front and side elevations of the valve.

Like letters of like kinds denote similar parts in each figure.

The nature of the invention relates to improvements in sliding valves, for the purpose of making them more durable and effective, as well as cheaper in first cost, and consists in the combination of a valve of peculiar construction with sheet-copper guides, in which the valve traverses; in the means employed in operating the valve, and in the combination and arrangement of the principal operative parts of the whole device, all as more fully hereinafter described.

In the drawing—

A represents the valve-box or case, having lateral branches A′ and A″ and vertical branches A‴.

The branches A′ and A″ are cylindrical in form within and without, having polygonal faces on the outside, near each end, and a central opening, *a*, while the branch A‴ is lozenge-shaped on a cross-section within and without, having a central opening, *b*, and extending both above and below the lateral branches, with its shortest diameter on the line of the lateral branches lengthwise.

The top of the branch A‴ is surmounted with a cylindrical cup-shaped plate, *c*, the edges of which are provided with screw-threads upon the outsides, while the branches A′ and A″ are threaded upon their insides, near the respective ends. The parts thus described are all cast in one piece, of suitable metal.

Within the openings *a* in the lateral branches the valve-seats B, which are annular in form, are arranged in such a manner that the inner faces, which are lozenge-shaped project a little into the openings *b* in the branch A‴, and correspond in all parts with the lozenge form of this opening.

The ends *b′* of the openings *b* are provided with V-shaped sheet-copper guides C, extending vertically near the whole length of said opening.

A polygonal cap, D, having a neck, *d*, extending vertically above its center, screws down upon the plate *c*, and is provided with a central opening, *e*, extending through the cap and neck, having screw-threads upon it, which engage with corresponding screw-threads upon the spindle E.

The outer upper portion of the neck *d* is in turn provided with screw-threads, which fit corresponding screw-threads in the stuffing-box F which covers it. This stuffing-box has a central opening in its top of a size sufficient for the spindle to pass through it.

The valve G is elliptic in form upon a front view, and lozenge-shaped upon an end view, and provided with wings *f* upon its sides; it tapers regularly and slightly upon all sides from top to bottom, and has a central opening, *g*, from top to bottom provided with screw-threads which engage with corresponding screw-threads upon the foot of the spindle.

The spindle E has right-hand screw-threads upon its upper portion where it engages with the cap D, and left-hand threads where it engages with the valve G, and is surmounted with a proper hand-wheel, H.

In operation, by turning of the hand-wheel to the right the spindle is depressed in the cap, and at the same time, by its left-hand screw-threads, it depresses the valve in its seats, while by a reverse motion the valve is elevated in the same way, thus increasing the speed of movement, and saving material in the spindle, in the valve-box, and in the cap.

In the operation of depressing the valve it wedges itself into the valve-seats more and more firmly, as force is applied, until the valve closes the opening in the valve tightly.

The valve-seats are cast, of suitable composition, in iron molds, and are afterward finished under the hammer, which gives the advantage of great hardness and consequent durability and a more accurate proportion.

The valves are cast of suitable composition and finished up in the way above described, and in use, as they become worn, may be reduced a little in length by filing off from the bottom, which will enable them to fit as closely as before. The advantage of the lozenge-shaped form of the valve lies in its cheapness, taking but little metal; in its ability to prevent several wedging surfaces, by which it is held firmly in position without the danger of binding or sticking in the seats, while its wings have a certain freedom of motion in the guides.

The advantage of the copper guides lies in the smoothness of the bearing which they give against the outsides of the wings and the edges of the valve proper, which press upon the outsides of said guides, and in the protection given in casting, hereinafter described.

In the construction of this valve I take the valve-seats, made as above mentioned, place the valve in position between them, and the copper guides in place at the sides, covering the outer edges of the wings, and clamp or hold them together by any suitable means. Sand is then built around such parts as are not to be exposed to molten material, and, thus arranged, the whole forms a core, which is placed in the mold, and the valve-box cast of suitable metal around it in the usual manner.

Having thus described my invention,

What I claim as new therein is—

1. The lozenge-shaped sliding valve G, in combination with the sheet-copper guides C, both constructed substantially as described and shown, for the purpose set forth.

2. The combination of the spindle E provided with right and left-hand screws, screws, the cap D provided with right-hand female-screw, and the valve G provided with left-hand female-screw, all constructed, arranged, and operated substantially as described and shown, for the purposes set forth.

3. The combination of the case A, the valve-seats B, the valve G, the guides C, the cap D, the spindle E, the stuffing-box F, and the hand-wheel H, all constructed, arranged, and operated substantially as described and shown, for the purposes set forth.

In testimony that I claim the foregoing I have hereunto set my hand and seal this    day of December, 1870.

GEORGE MURRAY, JR. [L. S.]

Witnesses:
WILLIAM DAVIS,
J. W. HAMMOND.